J. T. ANDREW.
BOLL WEEVIL DESTROYER.
APPLICATION FILED JUNE 15, 1916.

1,216,917.

Patented Feb. 20, 1917.
3 SHEETS—SHEET 1.

Witness
Edwin J Beller

Inventor
James T. Andrew,
by McKenen, Ginsta & MacKaye,
Attorneys.

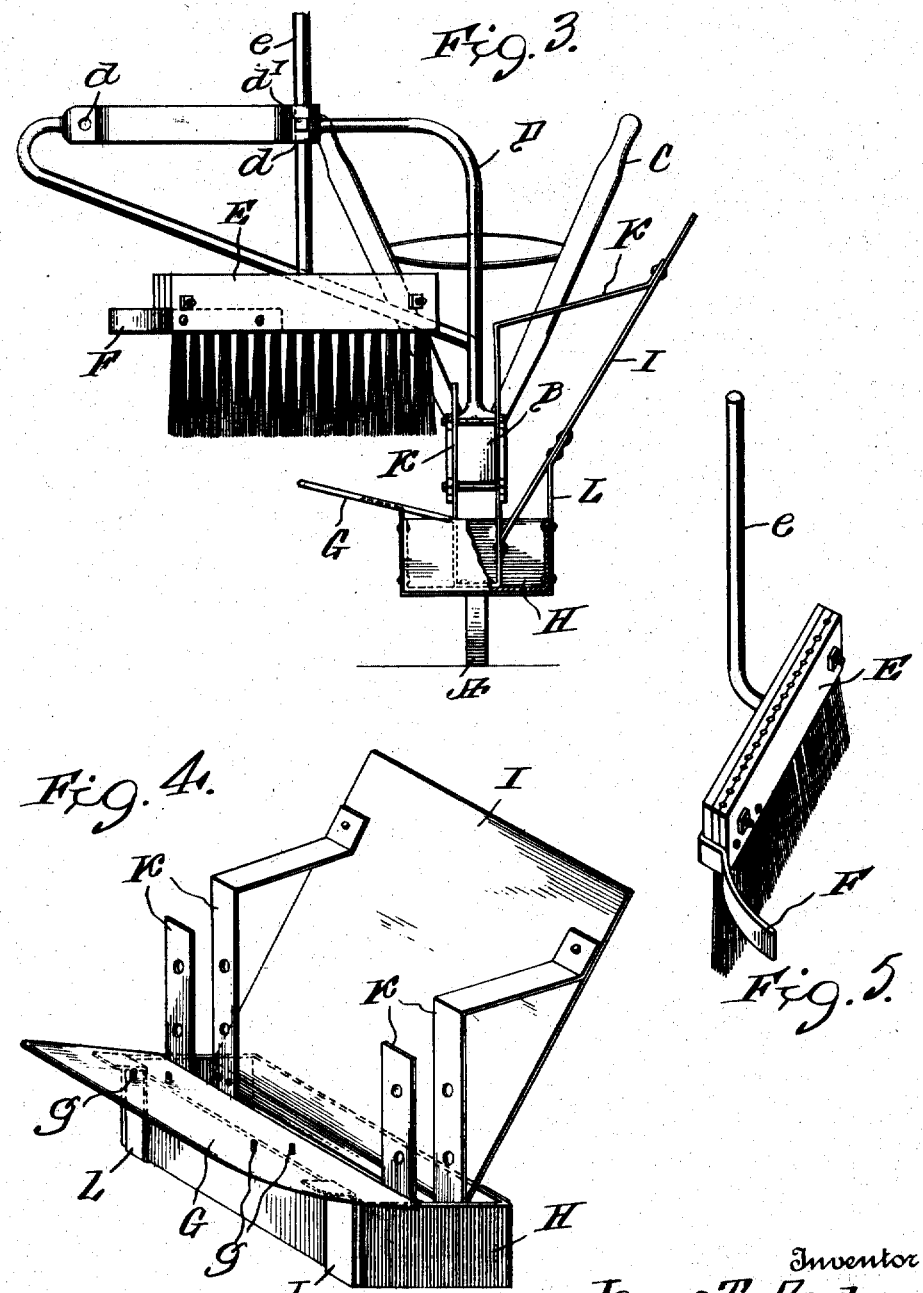

J. T. ANDREW.
BOLL WEEVIL DESTROYER.
APPLICATION FILED JUNE 15, 1916.
1,216,917.
Patented Feb. 20, 1917.
3 SHEETS—SHEET 3.
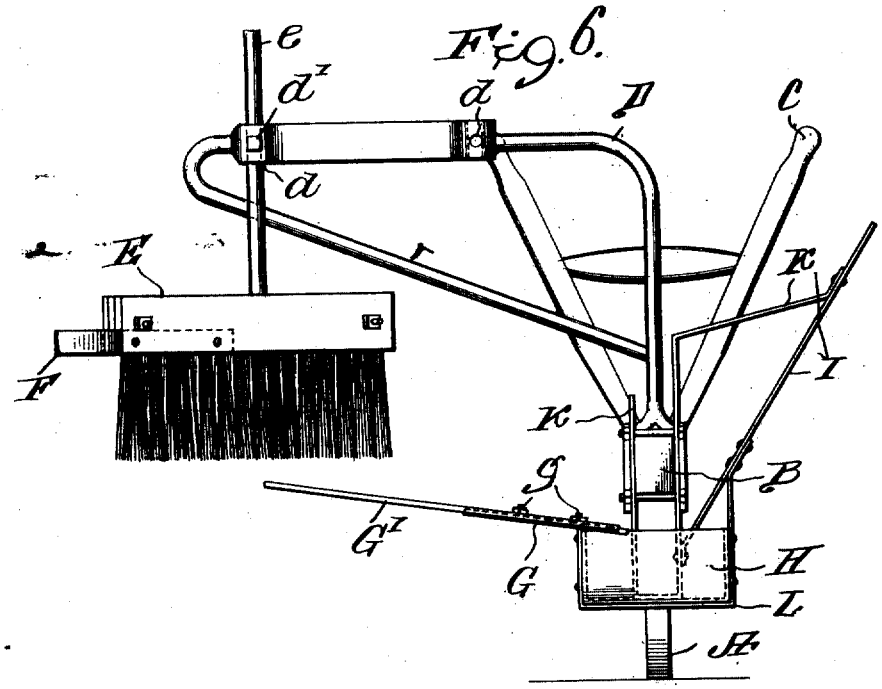
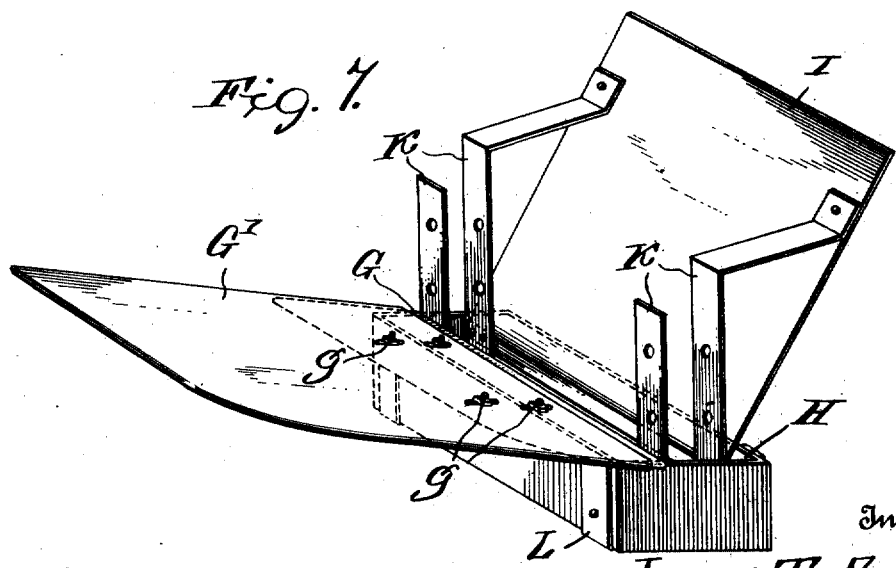
Witness
Edwin J Beller.
Inventor
James T. Andrew,
by Wilkinson, Guista & Machay
Attorneys

UNITED STATES PATENT OFFICE.

JAMES T. ANDREW, OF MONTGOMERY, ALABAMA.

BOLL-WEEVIL DESTROYER.

1,216,917.  Specification of Letters Patent.  Patented Feb. 20, 1917.

Application filed June 15, 1916. Serial No. 103,816.

*To all whom it may concern:*

Be it known that I, JAMES T. ANDREW, a citizen of the United States, residing at Montgomery, in the county of Montgomery and State of Alabama, have invented certain new and useful Improvements in Boll-Weevil Destroyers; and I do hereby declare the following to be a full, clear, and exact description of the invention, such as will enable others skilled in the art to which it appertains to make and use the same.

My invention relates to improvements in apparatus for collecting and destroying boll weevils from fields of standing cotton, and it is intended to provide an implement which will shake and brush the insects from the cotton plants, and deposit them in a receptacle where they are burnt.

This insect attacks the very young and tender bolls after the plant is in flower, and perforates the boll, depositing its larvæ therein. The small boll, commonly called a "square", soon dies and becomes loose on the stalk, and the least agitation will shake it off, when it will drop to the ground. In due course, the full grown weevil will emerge therefrom, ready to attack other bolls.

According to my invention, I provide an arrangement by which the cotton plants are agitated and subjected to a brushing effect, and the squares containing the young weevils are directed into a pan containing destroying means, such as a charcoal or other fire, where the squares are consumed and the young weevils are killed.

My invention is specially intended to provide a cheap, simple, and durable apparatus for accomplishing the result, which may be supplied to, and used by the small cultivators; and which will require no more than a single draft animal and one man to operate the same.

My invention will be understood by reference to the accompanying drawings, in which the same parts are indicated by similar symbols throughout the several figures.

Fig. 3 is front view of same, parts being broken away.

Fig. 4 is a detail showing the fire pan, detached from the apparatus.

Fig. 5 is a detail showing the brush with guide arm attached thereto.

Fig. 6 is a front view showing a modification in which the brush is placed farther away from the plow and there is an extensible shelf to the fire pan, and Fig. 7 is a detail showing the fire pan and extensible shelf as detached from the apparatus.

A represents an ordinary plow used in the cultivation of cotton, provided with the usual beam B and handles C. Attached to this beam is a frame D, having one or more clamp sockets $d$, provided with clamp screws $d'$ to adjustably hold the stem or handle $e$ of the brush E. This brush is preferably provided with a curved arm F, adapted to project into the branches of the cotton plant, and to direct the same with the main stalk to the brush. The brush is preferably set at an angle, as shown most clearly in Figs. 1 and 2, so that any solid particles brushed or shaken from the cotton plant will be directed above the shelf G, which is inclined toward the fire pan H, and directs into said pan any solid particles falling on said shelf.

Figure 1:
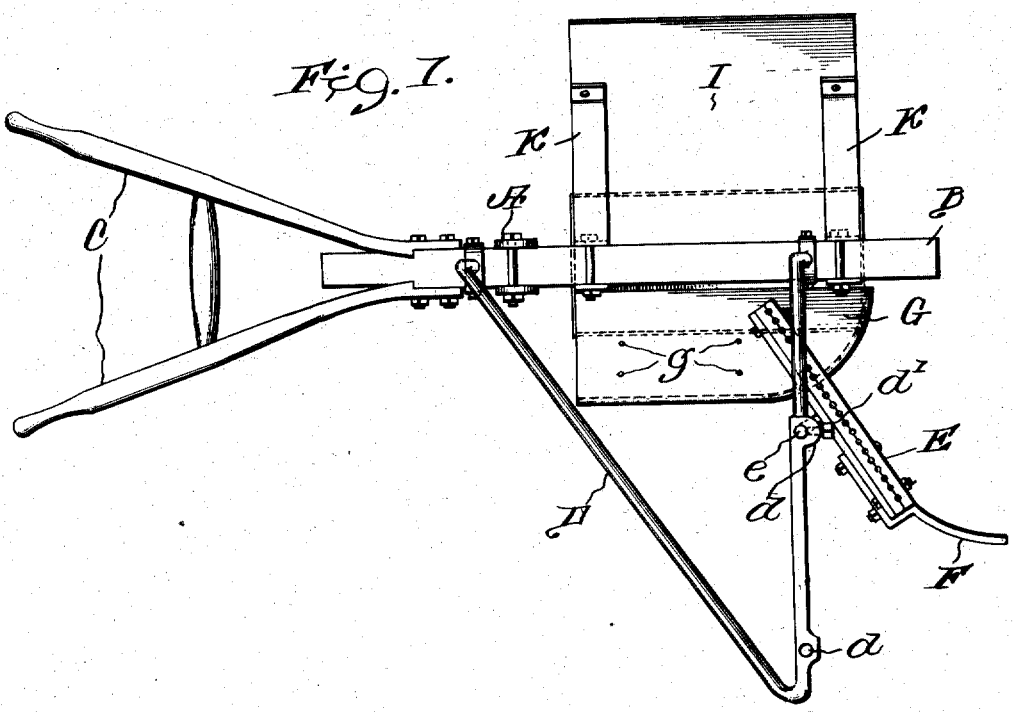
Figure 1 is a plan view of the boll weevil destroyer.

On the opposite side of the plow beam B, I provide a deflecting plate I, which is attached to the braces K which braces are secured to the plow beam, as shown most clearly in Figs. 1 and 3. These braces also assist in supporting the pan H.

Straps L are secured beneath the pan H, and are attached to the deflecting plate I, and the beam B, as shown most clearly in Fig. 3.

The frame D projects considerably above and at one side of the plow beam, so that the brush may be adjusted vertically according to the average height of the plants in the field, being treated. The brush may be adjusted laterally, according to the distance that the plow is from the cotton row, by shifting the stem $e$ in or out on the frame to one or the other of the clamp sockets $d$. While I have shown two such sockets, which will ordinarily be sufficient for all practical purposes, for nicer adjustments there may be several such sockets.

When plowing out the middle between the rows, it will generally be necessary to shift the brush outward as is shown in Fig. 6, and in such case, an extension shelf $G'$ is provided, which may be conveniently and adjustably attached to the shelf G by the bolts and nuts g, as shown in Figs. 6 and 7.

Figure 2:
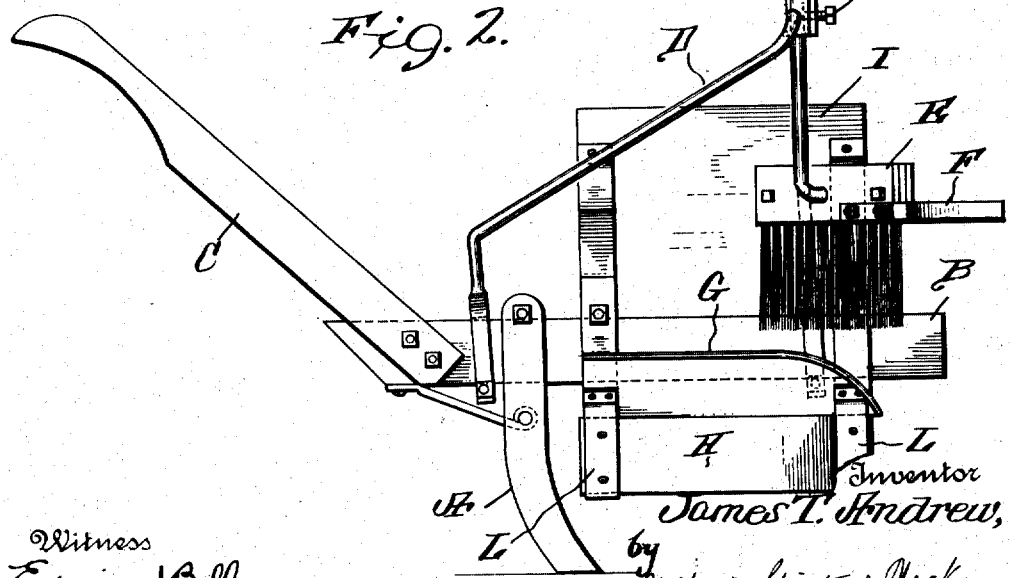
Fig. 2 is a side elevation of same.

The operation of the device is as follows:

When plowing close to the cotton row, the brush would be in the position shown in Figs. 1, 2, and 3, and adjusted vertically to correspond with the average height of the cotton plants. As the plow is pulled forward, the curved arm F will gather in the stalk and branches of the plant and direct the same to the brush E, which being set at an angle as shown, will brush the squares containing weevils off of the plant, and these will fall on the inclined shelf G, and will be directed into the fire pan H. The deflecting plate I will prevent any of the squares or other solid matter from being thrown on the opposite side of the plow beam, and will cause same to slide down into the fire pan.

Where it is desired to run the plow at some distance from the cotton row, the extension plate G' is added as shown in Figs. 6 and 7, and the brush is moved outward on the frame D as shown in Fig. 6, the operation of the apparatus being seen, as previously described.

It will be noted that the shelf G or G' and the deflecting plate I will both serve as deflecting plates constituting in effect a hopper for directing the bolls brushed off the plant into the fire pan.

It will be also seen that any grown weevils or other insects, that are not stuck too closely to the cotton plant, will also be brushed off and directed to the fire pan incident to the operation of the apparatus.

While I have shown the apparatus attached to a plow beam, it may be separately mounted, or may be connected to the draft beam or any suitable part of other implements used in the tillage of cotton; but I prefer to use it as an attachment to the ordinary plow or cultivator, not only because the farmers must necessarily have these implements, but also because it is more economical to combine the acts of tilling the soil and destroying the boll weevils into a single operation.

It will be obvious that various modifications might be made in the herein described apparatus, and in the construction, combination, and arrangement of parts, which could be used without departing from the spirit of my invention.

Having thus described my invention, what I claim and desire to secure by Letters Patent of the United States, is:

1. A boll weevil destroyer attachment for agricultural implements provided with draft beams, comprising a frame to be secured to the draft beam of the implement and projecting upwardly and laterally therefrom, a brush adjustably connected to said frame, a curved arm projecting outwardly from said brush and adapted to guide the cotton stalks inwardly toward said brush, a pan carried by the draft beam, and inclined guide plates adapted to receive solid objects brushed off or shaken from the cotton plants, and to guide same into said pan, substantially as described.

2. A boll weevil destroyer attachment for agricultural implements provided with draft beams, comprising a frame to be secured to the draft beam of the implement, and projecting upwardly and laterally therefrom, said frame being provided with a plurality of clamp sockets, a brush, having a handle, adjustably connected to one of said clamp sockets in said frame, a curved arm projecting outwardly from said brush and adapted to guide the cotton stalks inwardly toward said brush, a pan carried by the draft beam, and inclined guide plates adapted to receive solid objects brushed off or shaken from the cotton plants and to guide same into said pan, substantially as described.

In testimony whereof, I affix my signature.

JAMES T. ANDREW.

Copies of this patent may be obtained for five cents each, by addressing the "Commissioner of Patents, Washington, D. C."